HELMUT ETTISCHER
THEODOR BAISCH
INVENTORS

ATTORNEYS

HELMUT ETTISCHER
THEODOR BAISCH
INVENTORS

BY R. Frank Smith
Steve W. Gremban
ATTORNEYS

United States Patent Office 3,391,626
Patented July 9, 1968

3,391,626
MIRROR MOVING MECHANISM FOR A
REFLEX CAMERA
Helmut Ettischer, Ruit, Kreis Esslingen (Neckar), and
Theo Baisch, Esslingen (Neckar), Germany, assignors
to Eastman Kodak Company, Rochester, N.Y., a corporation of New Jersey
Filed Oct. 20, 1965, Ser. No. 498,437
Claims priority, application Germany, Oct. 23, 1964,
K 54,332
10 Claims. (Cl. 95—42)

This invention relates generally to reflex cameras, and more particularly to a mirror moving mechanism for controlling the movement of a mirror in a reflex camera.

Mechanisms for moving a mirror in a reflex camera between viewing and non-viewing positions are well known in the art. In its viewing position, the mirror is positioned along the optic axis at an angle of substantially 45° thereto for reflecting a subject image into a viewfinder for viewing by the operator prior to making an exposure. In the non-viewing position, the mirror is moved out of the optic axis into light-tight engagement with the portion of the camera body supporting the viewfinder. Since the location of the mirror in each of its positions is relatively critical in a reflex camera, these known mechanisms for controlling the movement of the mirror had to be precisely manufactured to close tolerances in order to achieve a smooth functioning mechanism capable of achieving accurate, reliable results under repetitive operation. Also, such cameras had the further disadvantage of being relatively bulky since the rear lens of the objective system had to be positioned forward a sufficient distance to enable the mirror to be pivotally moved unobstructedly between its viewing and non-viewing positions. This invention is believed to provide a mirror moving mechanism that permits a more compact camera construction and obviates the necessity for costly, precise mechanisms without sacrificing quality or reliability.

This invention includes within its scope an improved mirror moving mechanism for a reflex camera including a variable fulcrum for the mirror. Accordingly, when the mirror is moved between its viewing and non-viewing positions, it is initially moved in a substantially vertical direction to enable it to clear the rear lens of the objective system, and then pivoted in an angular direction. Each disclosed embodiment of the mirror moving mechanism of this invention comprises a mirror pivotally mounted at one end of a bracket, the opposite end of which is pivotally mounted to the camera. A control member moves the mirror and bracket together to a first stop during which the mirror is moved in a substantially vertical direction to clear the rear lens, and then pivots the mirror alone in an angular direction to its non-viewing position.

One of the objects of the present invention is to provide an improved mirror moving mechanism for a reflex camera for moving the mirror between its viewing and non-viewing positions.

Another object of the invention is to provide an improved mirror moving mechanism for a reflex camera for moving the mirror in such a way that it clears the rear lens of the objective system as it is moved from its viewing position to its non-viewing position.

Another object of the invention is to provide an improved mirror moving mechanism for a reflex camera that is constructed of parts that do not have to be manufactured to precise, close tolerances, and yet provide for movement of the mirror between its viewing and non-viewing positions with a high degree of accuracy and repeatability.

Another object of the invention is to provide an improved mirror moving mechanism for a reflex camera that is of simple design and construction, thoroughly reliable and efficient in operation, and economical to manufacture.

Objects and advantages other than those set forth above will be apparent from the following description when read in connection with the accompanying drawings, in which.

Figure 1:
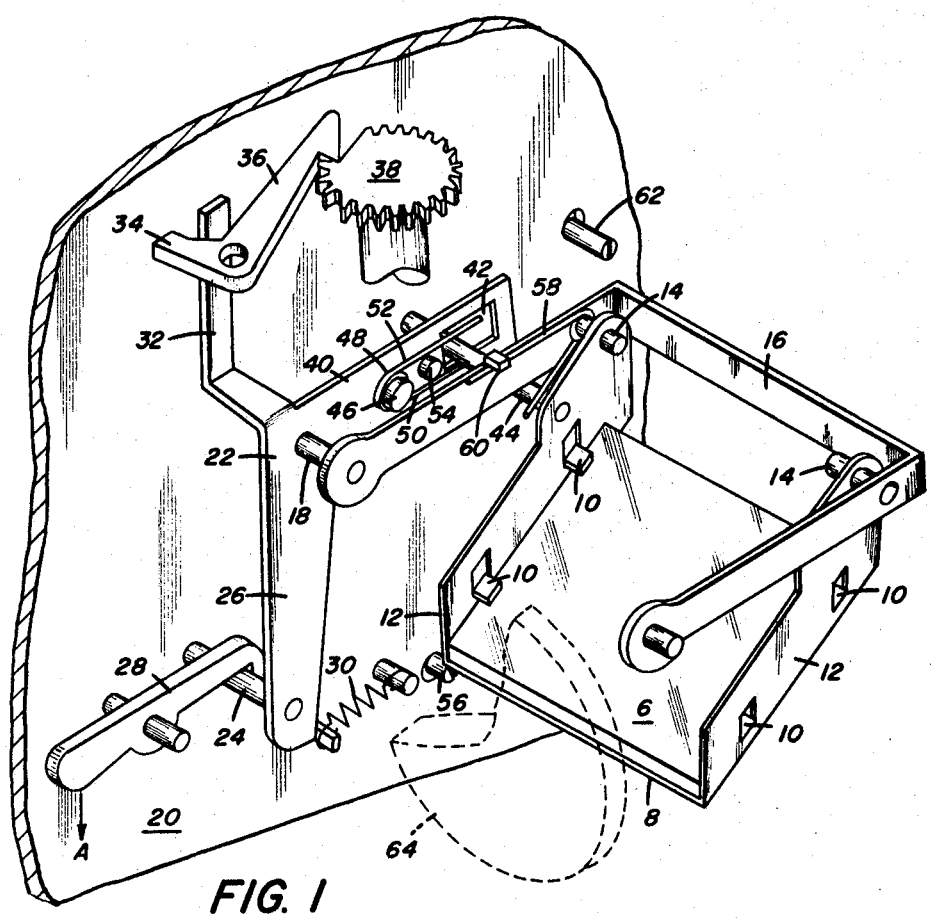
FIG. 1 is a schematic view in perspective of a mirror control mechanism for a reflex camera in which the mirror is shown in its viewing position, and the remaining parts of the camera have been omitted for purposes of clarity.

Referring now to the embodiment of FIG. 1, mirror means are provided comprising a mirror 6 of known type secured to a support member 8 by down-turned lugs 10. The support member 8 has side flanges 12 provided with aligned openings at one end thereof for receiving stub shafts 14 for pivotally mounting the mirror means to a U-shaped support bracket 16. The opposite ends of bracket 16 are pivotally mounted on a shaft 18 fixed to a camera wall, not shown, in FIG. 1, but shown as wall 20 in the embodiment of FIGS. 2–4. Shaft 14 is movable within limits by virtue of bracket 16 and mirror support 8 to form a variable fulcrum for mirror 8.

The drive mechanism for moving mirror 6 and bracket 16 comprises a three-armed lever 22 pivotally mounted on shaft 18. A pin 24 is secured to the end of arm 26, and is engageable by a pivotal latch 28 for releasably holding lever 22 in a cocked position against the bias of a spring 30. Arm 32 of lever 22 is movable into engagement with a leg 34 of a pivotal latch 36 for releasing a ratchet wheel or gear 38 that is operatively connected to a camera shutter, not shown. Arm 40 of lever 22 has a slot 42 near one end for receiving a laterally extending pin 44 mounted on one of the flanges 12 of mirror support member 8. Arm 40 further has a post 46 tightly encircled by the center portion of a spring 48, both legs 50, 52 of which normally engage opposite sides of pin 44. In the latched position of lever 22 as shown in FIG. 1, a lug 54 on arm 40 engages leg 50 of spring 48 moving it downwardly so that leg 52 exerts a spring force on pin 44 for resiliently urging mirror support member 12 against an adjustable stop member 56 for resiliently holding mirror 6 in its viewing position. Another spring 58 encircles shaft 14 and has one leg in engagement with a lug 60 on bracket 16, and its other leg in engagement with the upper side of pin 44 for resiliently interconnecting bracket 16 and mirror support member 8.

Figure 2:
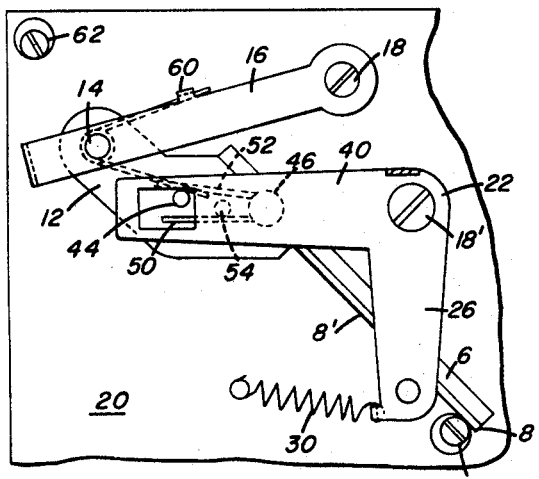
FIG. 2 is a left side elevation view of a portion of the mirror control mechanism of FIG. 1 modified to provide separate axes for the two elements of the control mechanism, to provide a different shaped mirror support member, and also showing the camera support wall.
Figure 3:
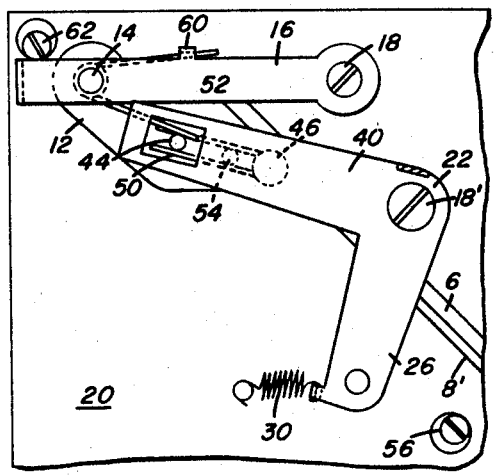
FIG. 3 is a view similar to FIG. 2 showing the position of the mirror and bracket after the bracket has been moved into engagement with a stop member.
Figure 4:
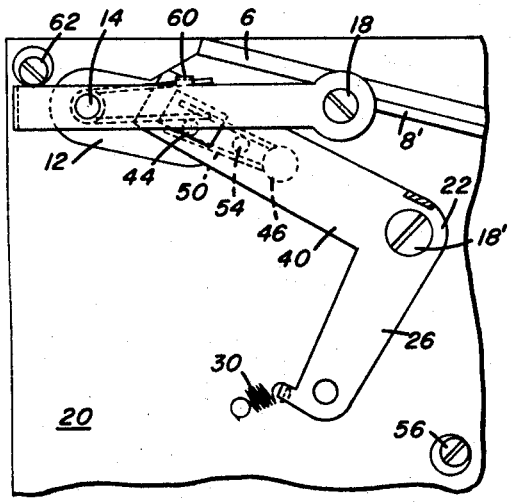
FIG. 4 is a view similar to FIGS. 2 and 3 showing the position of the mirror and bracket when the mirror has been moved into its non-viewing position.

In the embodiment shown in FIGS. 2–4, parts corresponding to parts shown in FIG. 1 will be denoted by the same numerals, and parts structurally different therefrom will be denoted by the same numerals primed. In this embodiment, control lever 22 and bracket 16 are pivotally mounted on separate shafts 18, 18' instead of both pivoting about shaft 18 as in FIG. 1. Also, the flanges 12' of mirror support member 8' are of a different structural configuration than the corresponding parts in FIG. 1. However, the functional operation of both embodiments is the same, the mechanisms in both initially moving the mirror in a generally vertical direction until the rear objective lens is cleared, and then moving the mirror in an angular direction into its non-viewing position.

In the operation of this invention with reference to both embodiments, release of latch 28 by movement thereof by any suitable mechanism such as a shutter release mechanism, not shown, in the direction of the arrow A releases cocked lever 22 for movement by its spring 30 in a counterclockwise direction. By virtue of pin 44 and spring legs 50, 52, movement of lever 22 will initially impart movement to mirror support members 8, 8' and bracket 16 through spring 58 for arcuately moving mirror 6 and shaft 14 in a generally vertical direction as seen in FIG. 3. This movement will continue until bracket 16 engages an adjustable stop 62 on the camera as seen best in FIG. 3 preventing any further movement of bracket 16. In this position, mirror 6 has been moved upwardly a sufficient distance so that the end of mirror 6 clears the rear lens 64, seen dotted in FIG. 1, of the optical system. Continued movement of lever 22 under the action of spring 30 causes mirror support members 8, 8' and mirror 6 to be pivotally moved about shaft 14 into its non-viewing position in engagement with a portion of the camera supporting a viewfinder, not shown. The lever 22 is moved by its spring 30 a trifle farther into engagement with a stop, not shown. This additional movement of lever 22 causes lug 54 to engage leg 52 of spring 48 and withdraw it from pin 44 causing the tensioned leg 50 to resiliently urge mirror support member 8 into engagement with any suitable stop, not shown, with mirror 6 in its non-viewing position as seen in FIG. 4. When this occurs, arm 32 releases latch 36 permitting any shutter mechanism connected thereto, not shown, to run down and make an exposure in a normal way. Following the exposure, lever 22 may be returned to its cocked position by any suitable mechanism, but preferably the film winding and shutter cocking mechanism, not shown. This, in turn, returns bracket 16 and mirror support members 8, 8' to their original position with mirror 6 in its viewing position, as seen in FIGS. 1 and 2.

The invention has been described in detail with particular reference to one embodiment thereof, but it will be understood that variations and modifications can be effected within the spirit and scope of the invention as described hereinabove, and as defined in the appended claims.

We claim:

1. In an improved mirror moving mechanism for a reflex camera, the combination comprising:

mirror means movable between viewing and non-viewing positions;

support means for said mirror means and pivotable between a normal first position, in which said mirror means is in its viewing position, and a second position, in which said mirror means is in a position intermediate its viewing and non-viewing positions;

means interconnecting said support means and said mirror means to provide relative movement therebetween; and moving means for said mirror means and support means for initially pivoting said support means to its second position, and then pivoting said mirror means alone relative to said support means to its non-viewing position.

2. The invention according to claim 1 wherein said support means is movable to its second position by said mirror means.

3. The invention according to claim 1 wherein said mirror means is moved in a generally vertical direction until said support means is moved to its second position, and then said mirror means is pivotally moved into its non-viewing position.

4. The invention according to claim 1 and further including a stop means for said support means for limiting movement of said support means to its second position.

5. The invention according to claim 1 wherein said mirror means has a pin secured thereto, said support means comprises a pivotal bracket to which one end of said mirror means is pivotally secured, and said moving means comprises a lever for engaging and moving said pin.

6. The invention according to claim 5 wherein a spring is interposed between said pin and said bracket.

7. In an improved mirror moving mechanism for a reflex camera, the combination comprising:

mirror means movable between viewing and non-viewing positions;

a movable bracket movable by said mirror means, and connected to said mirror means for relative movement therebetween;

stop means for said movable bracket; and moving means connected to said mirror means for initially moving said mirror means from its normal viewing position in one general direction until said bracket is moved by said mirror means into engagement with said stop means, and then moving said mirror means relative to said bracket in a different direction into its non-viewing position.

8. The invention according to claim 7 wherein said bracket is pivotal about one end, and said mirror means is pivotally secured to its other end.

9. The invention according to claim 8 wherein said mirror means has a pin secured thereto, and said moving means comprises a lever for engaging and moving said pin.

10. The invention according to claim 9 wherein a spring is interposed between said mirror means and said bracket.

References Cited

UNITED STATES PATENTS 2,352,177   6/1944   Bolsey _____ 95—42

FOREIGN PATENTS 877,542   5/1953   Germany.

JOHN M. HORAN, *Primary Examiner.*